United States Patent
Shelke et al.

(10) Patent No.: US 12,548,608 B1
(45) Date of Patent: Feb. 10, 2026

(54) SIGNAL RECEIVER WITH ADAPTIVE STROBE GATING AND REDUCED POWER DATAPATH ARCHITECTURE

(71) Applicant: Cadence Design Systems, Inc., San Jose, CA (US)

(72) Inventors: Anirudha Shelke, Maharashtra (IN); Ashwin S. M., Kerala (IN)

(73) Assignee: Cadence Design Systems, Inc., San Jose, CA (US)

( * ) Notice: Subject to any disclaimer, the term of this patent is extended or adjusted under 35 U.S.C. 154(b) by 177 days.

(21) Appl. No.: 18/422,209

(22) Filed: Jan. 25, 2024

Related U.S. Application Data

(60) Provisional application No. 63/442,416, filed on Jan. 31, 2023.

(51) Int. Cl.
  *G11C 7/22* (2006.01)
  *G11C 7/10* (2006.01)
  *G11C 29/52* (2006.01)

(52) U.S. Cl.
  CPC .......... *G11C 7/222* (2013.01); *G11C 7/1087* (2013.01); *G11C 29/52* (2013.01)

(58) Field of Classification Search
  CPC ........ G11C 7/222; G11C 7/1087; G11C 29/52

USPC ...................................................... 365/233.1
See application file for complete search history.

(56) References Cited

U.S. PATENT DOCUMENTS

| | | | | |
|---|---|---|---|---|
| 2007/0208980 A1* | 9/2007 | Gregorius | ........... | G06F 13/4059 714/731 |
| 2012/0161854 A1* | 6/2012 | Hidaka | .................. | G09G 5/008 327/524 |

* cited by examiner

*Primary Examiner* — Huan Hoang
(74) *Attorney, Agent, or Firm* — Mark H. Whittenberger, Esq.; Holland & Knight LLP

(57) ABSTRACT

An integrated circuit component comprises a signal input to receive, via an external signal link, a data strobe signal comprising a sequence of data-timing pulses preceded by a data preamble interval and succeeded by a data postamble interval, and a sequence of parity-timing pulses preceded by a parity preamble interval and succeeded by a parity postamble interval. The integrated circuit component further comprises a bypass circuit to generate a bypass signal from the data strobe signal and a strobe gating circuit coupled to the signal input and the bypass circuit and configured to generate an adaptive gating signal based on an internal gating signal, and the bypass signal, and to apply the adaptive gating signal to the data strobe signal to generate a gated strobe signal having at least one of the sequence of data-timing pulses or the sequence of the parity-timing pulses gated out from the data strobe signal.

19 Claims, 7 Drawing Sheets

SIGNAL RECEIVER WITH ADAPTIVE STROBE GATING AND REDUCED POWER DATAPATH ARCHITECTURE

RELATED APPLICATION(S)

This application claims benefit of U.S. Provisional Application No. 63/442,416, filed 31 Jan. 2023, the entire contents of which are incorporated herein by reference.

BACKGROUND

In strobe-timed signaling systems, "active" strobe edges that mark data sampling instants are preceded and succeeded by characteristic strobe preamble and postamble waveforms having idle-to-ready transitions and vice-versa. These overhead transitions can be gated-out of the timing signal supplied to trigger signaling sampling operations within link receivers. The interval between a preamble transition and the first active strobe edge (and/or the final active strobe edge and a postamble transition) may be brief, thus providing only a small margin of error within a receiver-generated gating signal used to filter-out the non-active strobe edges in the preamble or postamble. In addition, multiple sets of information can be included in a single timing signal, such as data and corresponding parity information, that at least partially overlap. A similar gating technique can be used to identify transitions in the timing signal associated with either the data or the parity information, so that such can be routed appropriately within the receiver. Given the ever-present demand for increased signaling bandwidth, gating signal timing margins are approaching limits imposed by chip-to-chip timing drift, reference clock jitter, and other timing skew sources, threatening to impede system performance.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Aspects of the present disclosure include a signal receiver with adaptive strobe gating and a reduced power datapath architecture. In various embodiments disclosed herein, a strobe gating signal is generated adaptively to yield a gating window that opens and closes deterministically with respect to active edges of the strobe signal. In a number of embodiments, an adaptive strobe gating signal is generated based on a bypass signal to track higher amounts of drift between the received strobe signal and a gate signal generated internally at the signal receiver, which are present with increased signaling speeds, such as those associated with high bandwidth memory (e.g., HBM3). For example, the incoming strobe signal can be divided down to generate the bypass signal which is used to clock a latch element and a flip-flop element in a strobe gating circuit. A bypass circuit can receive the data strobe signal and generate the bypass signal according to a parity latency in the system. The latch element and the flip-flop element can be used to assert and de-assert the adaptive strobe gating signal as appropriate. Such a strobe gating circuit can support adaptive gating with to account for drift. The strobe gating circuit design is also adaptable to support different parity latencies depending on the requirements of the specific system implementation.

In addition, the memory interfaces associated with certain high bandwidth memory devices may use clock forwarding in instances where burst data and a sampling clock are received from the memory devices (i.e., transferred from a signal transmitter to a signal receiver). For example, the receiver can sample the received data using the received data strobe, which may be adaptively gated, as described above. In general, the sampled data is usually transferred to an internal clock domain of the receiver (e.g., the memory controller) using a data buffer (e.g., a first-in-first-out (FIFO) buffer). In the embodiments described herein, a reduced power datapath architecture is implemented that reduces the power consumption associated with the transfer of the data to the internal clock domain of the receiver.

Figure 1:
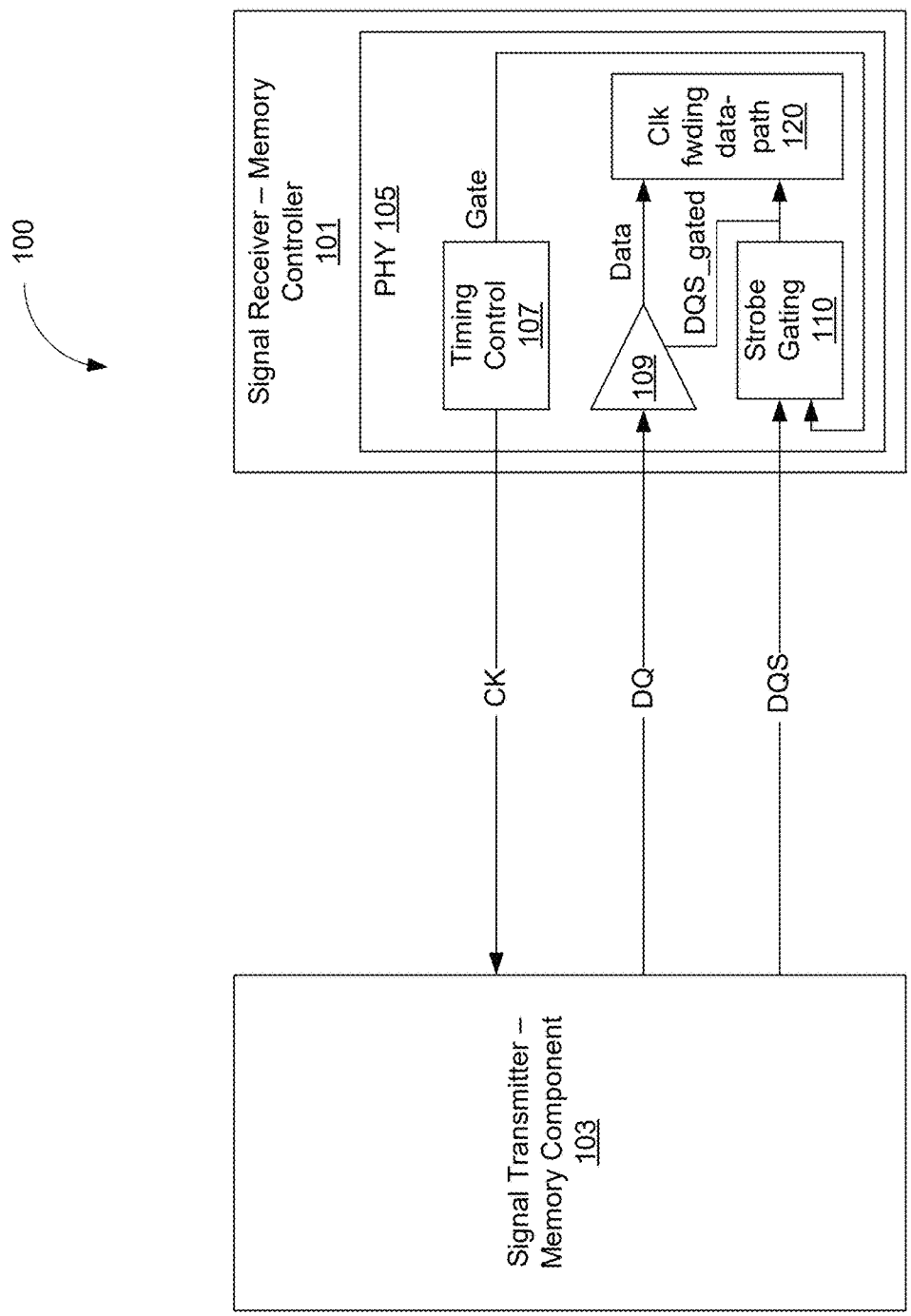
FIG. 1 is a block diagram illustrating a chip-to-chip signaling system in which an integrated-circuit memory controller implements adaptive strobe gating to receive strobe-timed data signals from an integrated-circuit memory component, according to an embodiment.

FIG. 1 illustrates a generalized embodiment of a chip-to-chip signaling system 100 in which a signal receiver, such as an integrated-circuit (IC) memory controller 101, implements adaptive strobe gating to receive strobe-timed data signals from a signal transmitter, such as an integrated-circuit memory component 103. In the particular example shown, the memory controller 101 generates a system clock signal which establishes a controller timing domain and which is forwarded to the memory component via clock link (CK) to establish a timing reference therein. The memory component 103 (e.g., DRAM. SRAM, Flash Memory or any other practicable data storage IC) can receive command/address information from the memory controller 101 via one or more command/address links (not shown) and, in response to memory read commands at least, transmit data (e.g., "read data") to the memory controller 101 via one or more data links (DQ) and an accompanying strobe signal via strobe link (DQS). To simplify discussion of strobe-to-data timing relationships, a single DQ/DQS link pair is shown, though numerous DQ links may be present, with a separate DQS link for every N DQ links (where N=1, 2, 4, 8, or any other practicable number). More generally, though skew-tolerant strobe-timed signaling is described in the context of a memory system/memory subsystem, the techniques and embodiments presented herein may be implemented in any strobe-timed chip-to-chip signaling arrangement.

Still referring to FIG. 1, the memory controller 101 includes, as part of a physical signaling interface 105 (PHY), timing control logic 107 together with a synchronous signal receiver 109, a strobe gating circuit 110, and a clock forwarding datapath 120. The timing control logic 107 can generate the system clock signal conveyed on clock link CK, as well corresponding internal clock signals and a gating signal (Gate) that can be trained, as described in more detail below, and ultimately used to generate an adaptive strobe gating signal which can be used to identify certain transitions in the incoming strobe signal (DQS), while being able to account for the occurrence of timing skew therein. For example, the strobe gating circuit 110 outputs a gated strobe signal "DQS_gated" to time data sampling operations within receiver 109. In certain embodiments, as described in more detail below, the strobe gating circuit 110 generates an adaptive gating signal from the internal gating signal (Gate) received from timing control logic 107 using a bypass signal. A bypass circuit within the strobe gating circuit 110 can receive the data strobe signal and generate the bypass signal by dividing down the received data strobe signal DQS. The strobe gating circuit 110 can use this adaptive gating signal to generate the gated strobe signal DQS . . . gated.

In one embodiment, strobe gating circuit logic combines (e.g., using a logic AND gate) the received data strobe signal DQS and the adaptive gating signal generated by an adaptive gate synthesizer circuit (also referred to herein as a "gate synthesizer" or "synthesizer" circuit). In one embodiment, the gate synthesizer receives the incoming data strobe signal DQS, the gating signal "Gate" supplied by timing control logic 107, as well as one or more clock signals. The gate synthesizer responds to these inputs by outputting the adaptive gating signal that is logically combined with the incoming DQS signal to produce the final gated strobe signal (DQS_gated). Depending on the implementation, the gated strobe signal DQS_gated can have overhead transitions within the DQS preamble and postamble "gated out" (i.e., suppressed, removed or otherwise eliminated) and/or active transitions representing data can be separated from active transitions representing corresponding parity information in the received data strobe signal DQS. In one embodiment, the gated strobe signal DQS_gated is provided to receiver 109 and to clock forwarding datapath 120 where it can be used to transfer the received data to an internal clock domain of the memory controller 101, as described in more detail below.

Before explaining gate synthesizer operation in greater detail, it is instructive to consider characteristic waveforms conveyed via the DQ and DQS signaling links. For example, the data waveform generated by memory component 103 conveys data symbols during respective "symbol times" that transpire back-to-back in a finite sequence referred to herein as a burst (or data burst). In one implementation, each transmitted symbol conveys a single bit of information (the simplest case) so that the corresponding symbol time is a bit interval or bit time, referred to as "tbit." Also, double-data-rate (DDR) signaling is possible in which two bits are conveyed synchronously with respect to each cycle of the strobe signal (i.e., with one bit in synchrony with a rising strobe edge and one bit in synchrony with the preceding or ensuing falling strobe edge). Further, the data strobe signal DQS output from the memory component 103 may have the same frequency but an arbitrary phase offset as the system clock CK, since the data strobe signal DQS is generated within memory component 103 which is clocked by the system clock CK but imparts a time-varying/time-drifting delay that contributes to the strobe-to-clock phase drift. As such, the strobe cycle time match the clock cycle time "tck" and thus tck=2*tbit. Although these assumptions are carried forward in the embodiments described below, in all cases individual symbol transmissions may convey more than one bit, the number of symbols conveyed per tck interval may be more than two (e.g., quad data rate or higher) or less than two (e.g., single data rate), and/or the strobe signal and system clock signal may have a non-unity frequency ratio.

Figure 2:
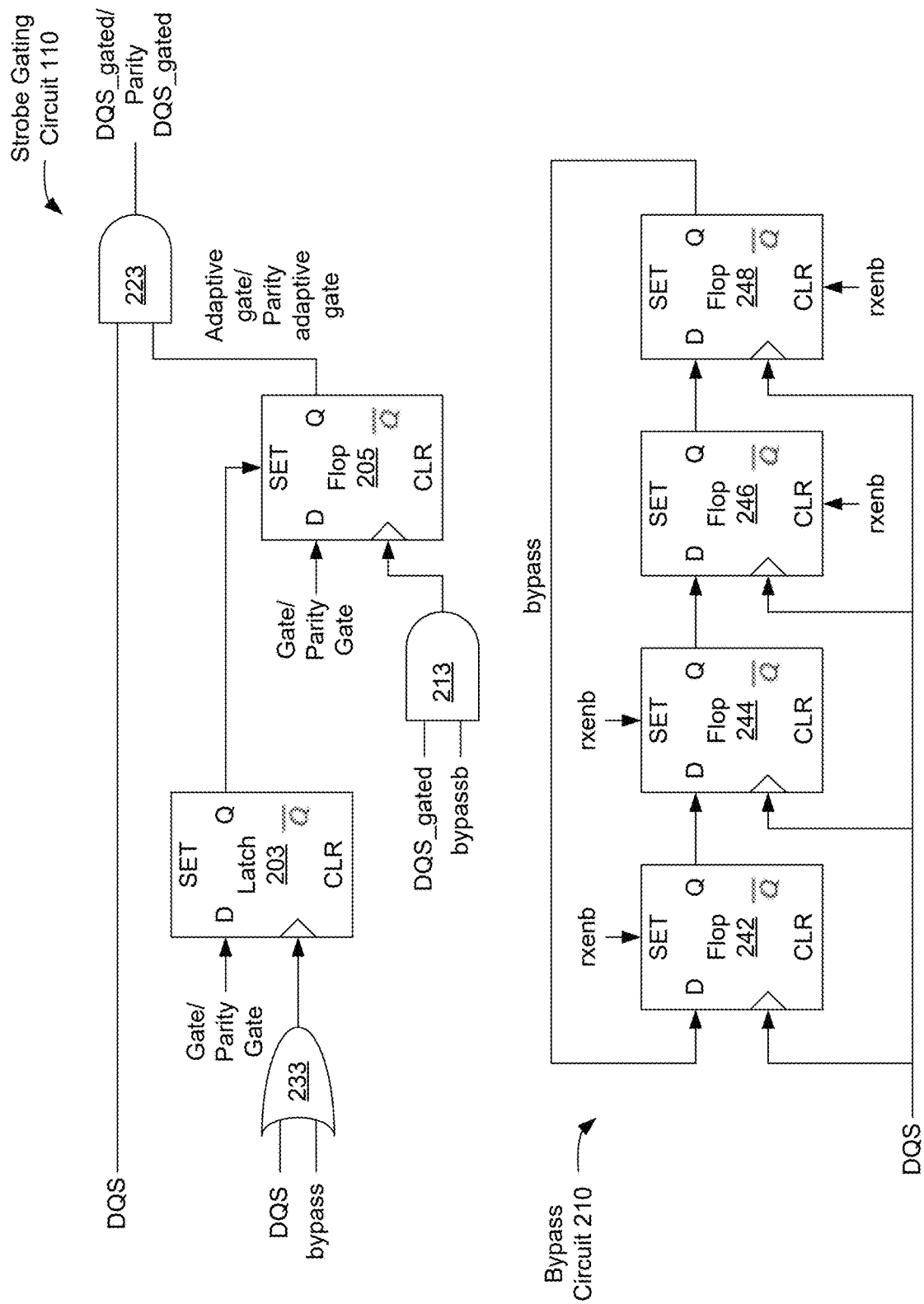
FIG. 2 is a block diagram illustrating a detailed view of a strobe gating circuit, according to an embodiment.

FIG. 2 is a block diagram illustrating a detailed view of a strobe gating circuit, according to an embodiment. As shown, strobe gating circuit 110 includes latch element 203, flip-flop element 205, logic AND gates 223 and 213, and logic OR gate 233. Together, latch element 203, flip-flop element 205, logic AND gate 213, and logic OR gate 233 can form the gate synthesizer to generate the adaptive gating signal "Adaptive gate," as described above. The adaptive gating signal "Adaptive gate" is logically combined with the received data strobe signal DQS in logic AND gate 223 to produce the gated DQS signal (DQS_gated).

In one embodiment, strobe gating circuit 110 further includes bypass circuit 210 formed from flip-flop elements 242, 244, 246, and 248 and configured to generate a bypass signal "bypass." Bypass circuit 210 functions as a clock divider receiving the data strobe signal DQS as an input and dividing it down into the resulting bypass signal. As shown, the bypass signal is equivalent to the data strobe signal DQS divided by four, which is appropriate when the parity latency is two. This is achieved by applying the inverse of an enable signal "rxen" (i.e., "rxenb" representing rxen "bar") at the set terminal of flip-flop elements 242 and 244 and at the clear (or reset) terminal of flip-flop elements 246 and 248. In other embodiments, the bypass signal can have some other relation to the input data strobe signal DQS, such as when there is some other parity latency, by configuring the flip-flop elements of bypass circuit 210 differently. The enable signal "rxen" can be formed from a logical combination (e.g., a logic OR) of the input gate signal "Gate" and the adaptive gating signal "Adaptive gate."

In operation, latch element 203 passes the input gate signal "Gate" received from timing control logic 107 to the latch output whenever the latch clock is low, and holds the latch output state (i.e., holds a steady-state output regardless of input gate signal transition) during the high phase of the latch clock. By this arrangement, the latch output is raised in response to a concurrent high input gate and low latch clock phase. That is, even as the input gate drifts early or late up to the skew limit, the output of latch element 203 will go high during the preamble low phase. As illustrated in FIG. 2, the latch clock can be the output of logic OR gate 233 which logically combines the data strobe signal DQS and the bypass signal.

In one embodiment, the output of latch element 203 is coupled to an asynchronous-set input of flip-flop element 205, so that the high output of latch element 203 signal will force the output of flip-flop element 205 (i.e., "Adaptive gate") high, thus ensuring that the adaptive gate signal will go high during the preamble ready-state, opening the adaptive gating window sometime during the preamble state regardless of tck drift in the input gate signal.

Once the adaptive gating window opens (i.e., when the adaptive gating signal is high), active edges of the incoming data strobe signal DQS propagate through AND gate 223 to the gated DQS output "DQS_gated." The gated DQS output signal is also received as an input to logic AND gate 213 along with the inverse of the bypass signal (i.e., "bypassb" or bypass "bar") to generate a flop clock signal for flip-flop element 205. The logical combination of DQS_gated and bypassb generated by AND gate 213 will go high with the first preamble pulse in DQS_gated causing flip-flop element 205 to sample the state of the input gate signal at that instant. The adaptive gating signal "Adaptive gate" will be asserted when the latch clock is zero and the input gate signal "Gate" becomes 1. For adaptability purposes, strobe gating circuit 110 ensures that the latch clock is 0 by using bypass signal "bypass" to clock the latch element 203 and the flip-flop element 205.

Figure 3:
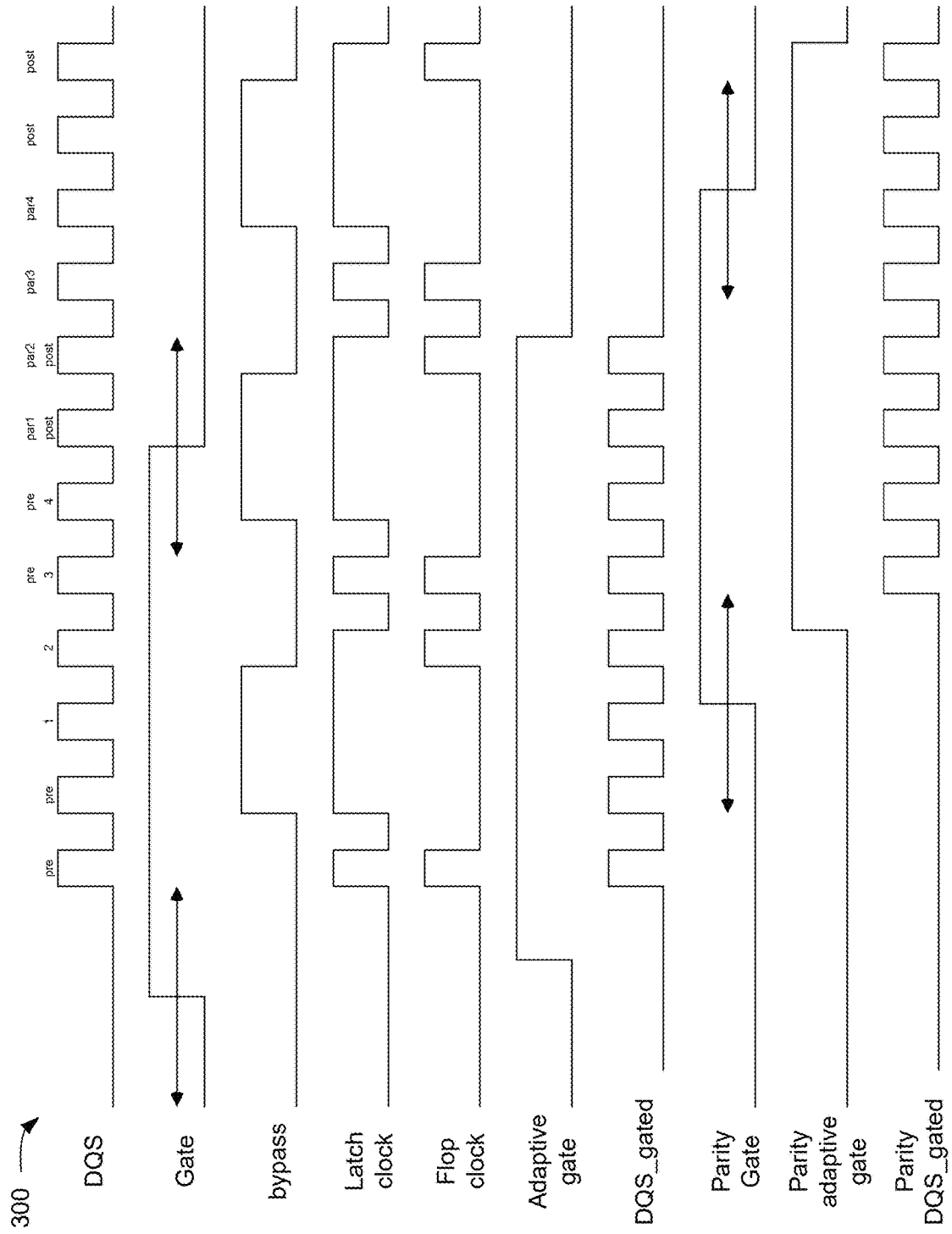
FIG. 3 is a timing diagram illustrating the operation of a strobe gating circuit to perform adaptive strobe gating, according to an embodiment.

FIG. 3 is a timing diagram illustrating the operation of a strobe gating circuit to perform adaptive strobe gating, according to an embodiment. The diagram 300 illustrates a number of signal waveforms corresponding to the circuit diagram in FIG. 2. These signal waveforms include the data strobe signal (DQS), the internal gating signal (Gate), the bypass signal (bypass), the latch clock, the flop clock, the adaptive gating signal (Adaptive gate), and the gated DQS signal (DQS_gated). As described above, the data strobe signal DQS can be received from a signal transmitter, such as memory component 103, at an input to strobe gating circuit 110. DQS can include a sequence of pulses (i.e., periods where the signal is at a logical high level separated by periods where the signal is at a logical low level). Depending on the specific protocol used by the signal transmitter and signal receiver, a number of active pulses can be used to transmit data, and such active pulses can optionally be sandwiched between one or more preamble and postamble pulses. For example, the DQS waveform in FIG. 3 shows two preamble pulses ("pre"), followed by four active pulses ("1-4"), followed by two postamble pulses ("post"). In other embodiments, there can be some other number of preamble, postamble, and/or active pulses.

In addition, the data strobe signal DQS can be used to transmit corresponding parity information. For example, the DQS waveform in FIG. 3 shows two parity preamble pulses ("pre"), followed by four active parity pulses ("par1-par4"), followed by two parity postamble pulses ("post"). As shown, the parity information can at least partially overlap with the data in the data strobe signal (i.e., one or more individual pulses are used to transmit both data and corresponding parity information). For example, active data pulses 3 and 4 are also associated with the parity preamble pulses, and the data postamble pulses are also associated with the active parity pulses par1 and par2. Accordingly, the strobe gating circuit 110 can further utilize an internal parity gating signal (Parity Gate), a parity adaptive gating signal (Parity adaptive gate), and a gated parity DQS signal (Parity DQS_gated), as described in more detail below.

In one embodiment, the internal gating signal (Gate), received at strobe gating circuit 110 from timing control logic 107 can be used to identify the pulses in the data strobe signal DQS corresponding to the data (e.g., including both the active pulses and the preamble and postamble pulses) and filter out other pulses, including those associated with the parity information, for example. Due to the potential for timing skew between the internal gating signal (Gate) and the received data strobe signal DQS, it can be possible for the internal gating signal to become misaligned with the appropriate pulses in the data strobe signal and for the gating process to fail. Accordingly, strobe gating circuit 110 can use a bypass signal (bypass) to generate a latch clock for the latch element 203 and a flop clock for the flip-flop element 205 of the gate synthesizer to generate the adaptive gating signal (Adaptive gate). The bypass signal removes "triggering zones" from the received data strobe signal, which causes the adaptive gate signal to be asserted and de-asserted, only at the desired times. In this manner, strobe gating circuit 110 enables the gate to move more with respect to the received data strobe signal without generating an incorrect adaptive gate signal. The so-called "triggering zones" can represent the zones where the adaptive gate signal will be asserted and de-asserted. For the latch clock, this can include the low state and for the flop clock, this can include the negative edge. Since the adaptive gating signal can compensate for any skew with respect to the received data strobe signal DQS, strobe gating circuit 110 can use the adaptive gating signal to generate an accurate gated DQS signal (DQS_gated).

In addition, a separate internal parity gating signal (Parity Gate), received at strobe gating circuit 110 from timing control logic 107 can be used to identify the pulses in the data strobe signal DQS corresponding to the parity information (e.g., including both the active pulses and the preamble and postamble pulses) and tilter out other pulses. In some embodiments, the signal receiver, such as memory controller 101 includes a separate instance of strobe gating circuit 110 dedicated for gating the parity information in the data strobe signal DQS. In other embodiments, however, a single instance of strobe gating circuit 110 is used with corresponding signal selection circuitry (e.g., switches, multiplexers) to select between the internal gating signals Gate and Parity Gate. As described above, strobe gating circuit 110 can use a bypass signal (bypass) to generate a latch clock for the latch element 203 and a flop clock for the flip-flop element 205 of the gate synthesizer to generate the adaptive parity gating signal (Parity adaptive gate). Since the adaptive parity gating signal can compensate for any skew with respect to the received data strobe signal DQS, strobe gating circuit 110 can use the adaptive parity gating signal to generate an accurate gated parity DQS signal (Parity DQS_gated).

Figure 4:
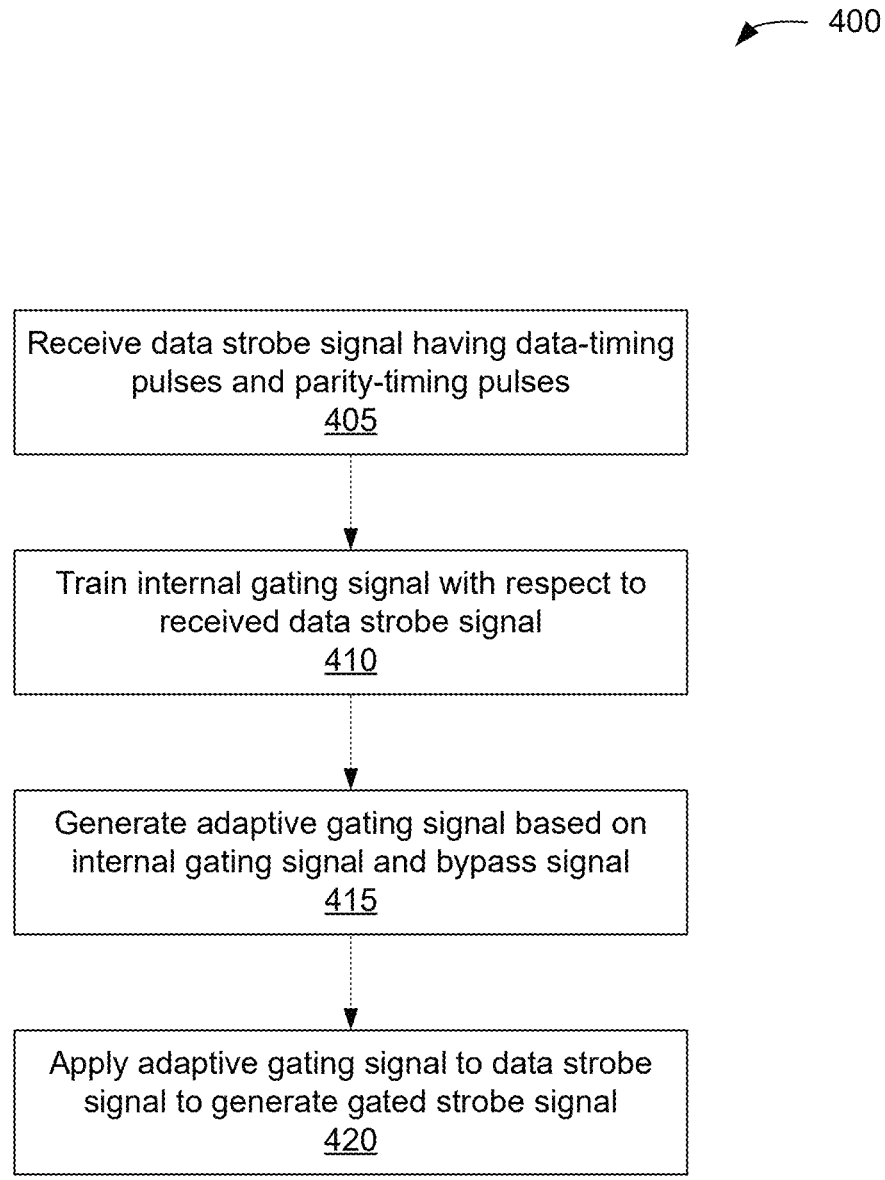
FIG. 4 is a flow diagram illustrating a method of operation of a strobe gating circuit, according to an embodiment.

FIG. 4 is a flow diagram illustrating a method of operation of a strobe gating circuit, according to an embodiment. The method 400 may be performed by processing logic that comprises hardware (e.g., circuitry, dedicated logic, programmable logic, microcode, etc.), software (e.g., instructions run on a processor to perform hardware simulation), firmware, or a combination thereof. In one embodiment, method 400 may be performed by strobe gating circuit 110, as shown in FIG. 1 and FIG. 2.

Referring again to FIG. 4, at operation 405, the processing logic receives, via an external signal link, such as DQS, a data strobe signal comprising (i) a sequence of data-timing pulses preceded by a data preamble interval and succeeded by a data postamble interval, and (ii) a sequence of parity-timing pulses preceded by a parity preamble interval and succeeded by a parity postamble interval. In one embodiment, the data strobe signal is received at strobe gating circuit 110 in a signal receiver, such as memory controller 101, from a signal transmitter, such as memory component 103. In one embodiment, the data strobe signal has a time-varying phase relative to an internal timing domain of the signal receiver (i.e., an integrated circuit component).

At operation 410, the processing logic trains an internal gating signal (Gate) with respect to the received data strobe and places the internal gating signal at an optimal position so that in the adaptive gating scheme, maximum drift can be supported in both directions. In one embodiment, the gating signal can initially be placed before the data strobe signal is received and will be moved towards the optimal transition of the data strobe signal using different delay elements in its path. During the training process, the processing logic can sample the data strobe signal (e.g., using a phase detector) according to the internal gating signal and the output can be sent to a finite state machine (FSM) which can make decisions of increasing/decreasing/finalizing the associated delay of the delay elements.

At operation 415, the processing logic generates an adaptive gating signal (Adaptive gate) based on (i) an internal gating signal (Gate) generated according to the internal timing domain, and (ii) a bypass signal (bypass) generated from the data strobe signal (DQS). In one embodiment, the strobe gating circuit 110 includes a bypass circuit 210 to generate the bypass signal. The bypass circuit 210 may be formed from a series of flip-flop elements, such as flip-flop elements 242, 244, 246, and 248, configured as a clock divider to divide the data strobe signal (DQS) received as an input down to the bypass signal (bypass) provided as an output. In one embodiment, the strobe gating circuit 110 comprises a gate synthesizer circuit to generate the adaptive gating signal (Adaptive gate). The gate synthesizer circuit may include a latch element 203 and a flip-flop element 205, wherein the latch element 203 and the flip-flop element 205 each receive the internal gating signal (Gate) as an input. In one embodiment, an output of the latch element 203 is provided to a set input of the flip-flop element 205, and the output of the flip-flop element 205 comprises the adaptive gating signal (Adaptive gate). In one embodiment, the latch element 203 is clocked by a latch clock signal, the latch clock signal comprising a logical OR combination (e.g., formed using logic OR gate 233) of the data strobe signal (DQS) and the bypass signal (bypass). In one embodiment, the flip-flop element 205 is clocked by a flop clock signal, the flop clock signal comprising a logical AND combination (e.g., formed using logic AND gate 213) of the gated strobe signal (DQS_gated) and an inverse of the bypass signal (bypassb).

At operation 420, the processing logic applies the adaptive gating signal (Adaptive gate) to the data strobe signal (DQS) to generate a gated strobe signal (DQS_gate) having at least one of the sequence of data-timing pulses or the sequence of the parity-timing pulses gated out from the data strobe signal (DQS). In one embodiment, the strobe gating circuit 110 comprises a logic AND gate 223 to logically combine the data strobe signal (DQS) and the adaptive gating signal (Adaptive gate) to generate the gated strobe signal (DQS_gated). In this manner, the adaptive gating signal (Adaptive gate) is to account for the time-varying phase of the data strobe signal (DWS) relative to an internal timing domain of the integrated-circuit component (i.e., memory controller 101).

Figure 5:
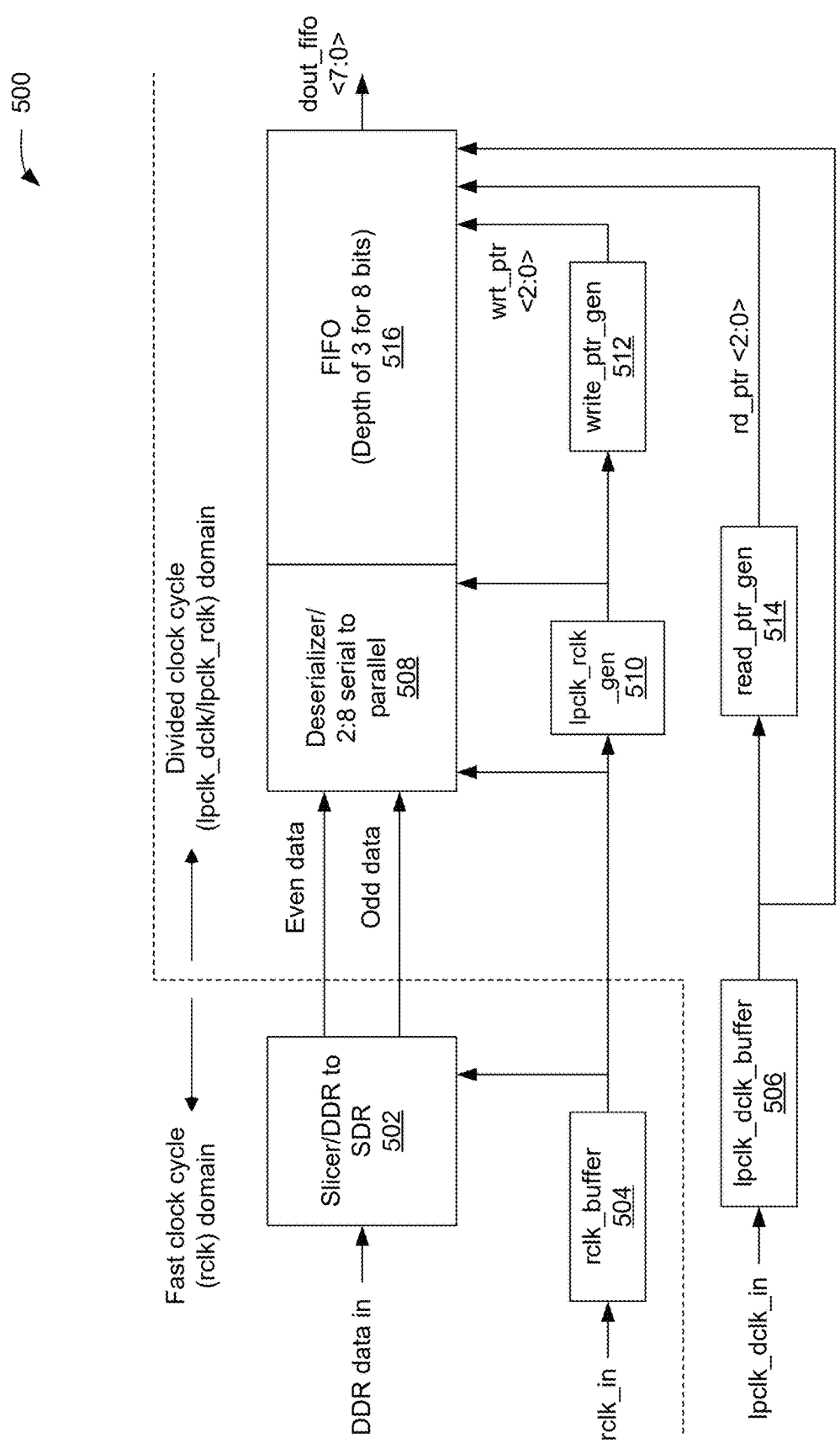
FIG. 5 is a block diagram illustrating a reduced power datapath architecture for clock forwarding at a signal receiver, according to an embodiment.

FIG. 5 is a block diagram illustrating a reduced power datapath architecture for clock forwarding at a signal receiver, according to an embodiment. The architecture 500 represents one possible implementation of the receiver 109 and the clock forwarding datapath 120, as shown in FIG. 1. The architecture 500 spans two clock domains within the signal receiver (e.g., memory controller 101). The first fast clock cycle domain can be based on the gated DQS signal generated by strobe gating circuit 110 and used to sample the data received from memory component 103. In FIG. 5, the gated DQS signal is referred to as "rclk_in." The second clock domain is divided clock cycle domain which is the internal clock domain of the signal receiver and can represent the clock signals generated by timing control logic 107. The architecture 500 can be used to perform the clock forwarding process of transferring from the fast clock cycle domain to the slower divided clock cycle domain.

Certain types of high bandwidth memory (e.g., HBM2E) support multiple different data burst lengths (e.g., 2 and 4). In such systems, the received data is sampled and deserialized as 1:2 and then 2:4. For example, for a data rate of 3.2 Gbps, the received clock may have a frequency of 1.6 GHz. After sampling (1:2), the data is transferred to the internal clock domain at 800 MHz (2:4). Such a process can utilize a memory buffer, such as a first-in-first-out (FIFO) buffer. Certain systems implement the FIFO in the fast clock cycle domain (e.g., 1.6 GHz) to support the variable data burst lengths. As memory speeds increase (such as with HBM3 having a data rate of 8.4 Gbps), however, the FIFO in the fast clock cycle domain can run at higher speeds, such as 4.2 GHz in HBM3, for example), thereby requiring a larger buffer depth, as well as increased power utilization and implementation complexity.

Figure 6:
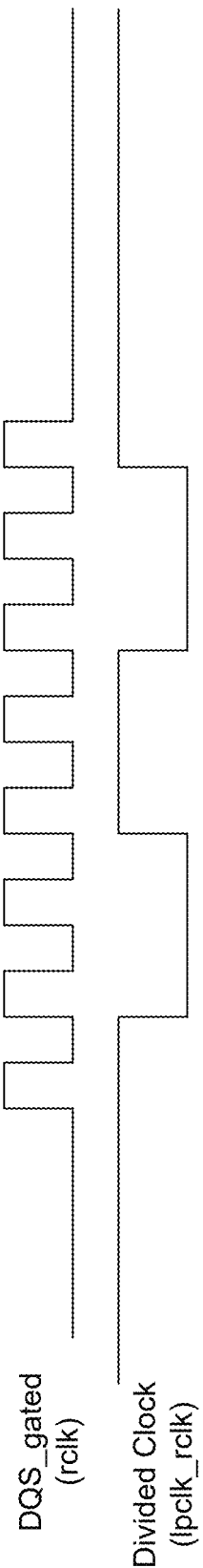
FIG. 6 is a timing diagram illustrating the operation of a reduced power datapath architecture, according to an embodiment.

Referring again to FIG. 5, the architecture 500 can include a data slicer 502 implemented in the fast clock cycle domain to receive the data being transferred (e.g., DDR data in). In addition, the architecture 500 includes a receive clock buffer (rclk_buffer) 504 which receives the gated DQS signal (i.e., rclk_in) from strobe gating circuit 110. Data slicer 502 can sample the received data using rclk_in to convert the DDR data to single data rate (SDR) data (1:2). As described above, the data strobe signal DQS is gated separately for data and for parity. In one implementation, the nature of the strobe gating circuit design ensures that the number of pulses in the gated DQS signal is always going to be a multiple of 4 (e.g., 8 pulses including 2 preamble pulses, 4 active pulses, and 2 postamble pulses) for either data or parity information. For example, as shown in FIG. 6, the gated DQS signal DQS_gated (i.e., rclk) includes 8 pulses, as identified using the adaptive gating signal described above. The output of slicer 502 can include SDR data (i.e., 1:2 deserialization arranged into even and odd data streams), but remains in the fast clock cycle domain, before transfer to the divided clock cycle domain which operates according to a divided clock (e.g., lpclk_dclk_in received at divided clock buffer (lpclk_dclk_buffer) 506). In one embodiment, the divided clock (lpclk_dclk) is a low-power divided clock signal generated internally within the memory controller 101 (e.g., by timing control logic 107).

In one embodiment, the output of slicer 502 is passed to a deserializer component 508, which operates in the divided clock cycle domain. Deserializer 508 can convert the input into deserialized data (e.g., 2:8 deserialization). In addition, the received clock can pass from receive clock buffer 504 to divided clock generator (lpclk_rclk_gen) 510. Divided clock generator 504 can receive rclk as an input and divide it down into the resulting divided clock (lpclk_rclk). Depending on the embodiment, divided clock generator 504 can have a structure similar to that of bypass circuit 210, such as including a sequence of flip-flop elements configured to generate the divided clock signal. If, for example, in one embodiment, the received clock (rclk) has a frequency of 4.2 GHz (to support the 8.4 Gpbs data rate), the divided clock signal (lpclk_rclk) can have a frequency of 1.05 GHz. This is illustrated further in FIG. 6.

In one embodiment, the output of deserializer 508 is passed to FIFO 516, which operates in the divided clock cycle domain. In one embodiment, the FIFO has a buffer depth of 3 for 8 bits of data. The deserialized data can be written to a location in FIFO 516 indicated by a write pointer (e.g., wrt_ptr<2:0>) which is generated by write pointer generator (write_ptr_gen) 512 using the divided clock lpclk_rclk received from divided clock generator 510. When ready to be read out, the data can be read from a location in FIFO 516 indicated by a read pointer (e.g., rd_ptr<2:0>) which is generated by read pointer generator (read_ptr_gen) 514 using the divided clock lpclk_dclk received from divided clock buffer 506. The output from FIFO 516 is represented by dout_fifo<7:0>.

Since the majority of the circuitry in the architecture 500 (i.e., the deserializer 508 and FIFO 516) is moved to the divided clock cycle domain, significant power savings can be realized, since those circuit components need not operate in the fast clock cycle domain. Such an approach also avoids the propagation of the high frequency clock (e.g., lpclk_dclk_in, which is a divided version of dclk) throughout the rest of memory controller 101 and makes the clock forwarding datapath scalable to higher data rates.

Figure 7:
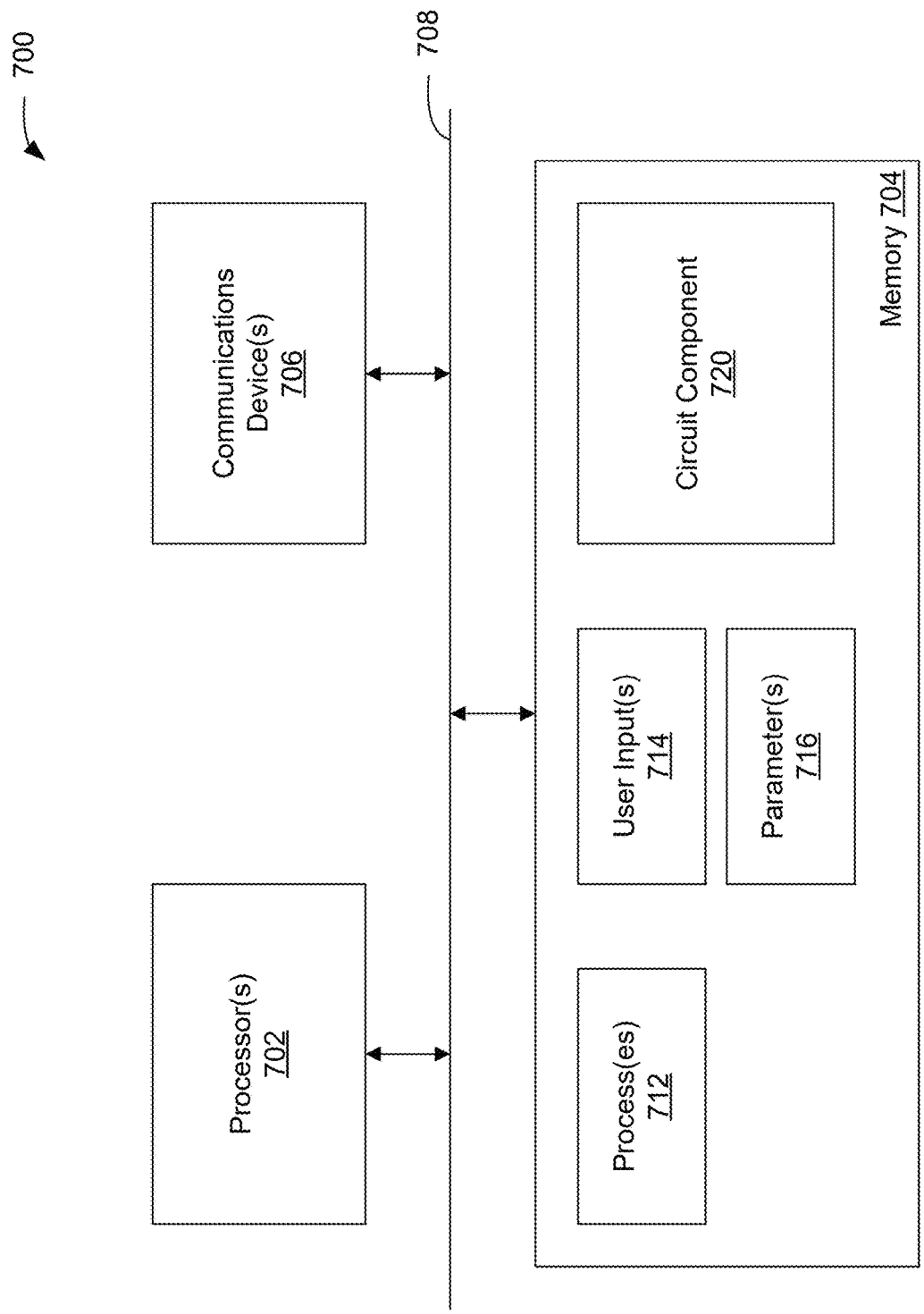
FIG. 7 is a block diagram illustrating a processing system for processing or generating a representation of a circuit component, according to an embodiment.

FIG. 7 is a block diagram illustrating one embodiment of a processing system 700 for processing or generating a representation of a circuit component 720. Processing system 700 includes one or more processors 702, a memory 704, and one or more communications devices 706. Processors 702, memory 704, and communications devices 706 communicate using any suitable type, number, and/or configuration of wired and/or wireless connections 708.

Processors 702 execute instructions of one or more processes 712 stored in a memory 704 to process and/or generate circuit component 720 responsive to user inputs 714 and parameters 716. Processes 712 may be any suitable electronic design automation (EDA) tool or portion thereof used to design, simulate, analyze, and/or verify electronic circuitry and/or generate photomasks for electronic circuitry. Representation 720 includes data that describes all or portions of the strobe gating circuit 110 and clock forwarding datapath 120 as shown in FIG. 1, FIG. 2, and FIG. 5. Memory 704 includes any suitable type, number, and/or configuration of non-transitory computer-readable storage media that stores processes 712, user inputs 714, parameters 716, and circuit component 720.

Communications devices 706 include any suitable type, number, and/or configuration of wired and/or wireless devices that transmit information from processing system 700 to another processing or storage system (not shown) and/or receive information from another processing or storage system (not shown). For example, communications devices 706 may transmit circuit component 720 to another system. Communications devices 706 may receive processes 712, user inputs 714, parameters 716, and/or circuit component 720 and cause processes 712, user inputs 714, parameters 716, and/or circuit component 720 to be stored in memory 704.

Embodiments of the present disclosure include an integrated circuit component comprising a signal input to receive, via an external signal link, a data strobe signal comprising (i) a sequence of data-timing pulses preceded by a data preamble interval and succeeded by a data postamble interval, and (ii) a sequence of parity-timing pulses preceded by a parity preamble interval and succeeded by a parity postamble interval. The integrated circuit component further comprises a bypass circuit to generate a bypass signal from the data strobe signal, and a strobe gating circuit coupled to the signal input and to the bypass circuit and configured to generate an adaptive gating signal based on (i) an internal gating signal, and (ii) the bypass signal, and to apply the adaptive gating signal to the data strobe signal to generate a gated strobe signal having at least one of the sequence of data-timing pulses or the sequence of the parity-timing pulses gated out from the data strobe signal.

In one embodiment, the bypass circuit comprises a series of flip-flop elements configured as a clock divider to divide the data strobe signal received as an input down to the bypass signal provided as an output. In one embodiment, the strobe gating circuit comprises a gate synthesizer circuit to generate the adaptive gating signal, the gate synthesizer circuit comprising a latch element and a flip-flop element, wherein the latch element and the flip-flop element each receive the internal gating signal as an input. In one embodiment, an output of the latch element is provided to a set input of the flip-flop element, and wherein an output of the flip-flop element comprises the adaptive gating signal. In one embodiment, the latch element is clocked by a latch clock signal, the latch clock signal comprising a logical OR combination of the data strobe signal and the bypass signal. In one embodiment, wherein the flip-flop element is clocked by a flop clock signal, the flop clock signal comprising a logical AND combination of the gated strobe signal and an inverse of the bypass signal. In one embodiment, the strobe gating circuit comprises a logic AND gate to logically combine the data strobe signal and the adaptive gating signal to generate the gated strobe signal, wherein adaptive gating signal is to account for drift in the data strobe signal relative to an internal timing domain of the integrated circuit component.

Embodiments of the present disclosure further include a method of operations of an integrated circuit component. In one embodiment, the method comprises receiving, via an external signal link, a data strobe signal comprising (i) a sequence of data-timing pulses preceded by a data preamble interval and succeeded by a data postamble interval, and (ii) a sequence of parity-timing pulses preceded by a parity preamble interval and succeeded by a parity postamble interval, generating, by a bypass circuit, a bypass signal from the data strobe signal, generating, by a strobe gating circuit, an adaptive gating signal based on (i) an internal gating signal, and (ii) the bypass signal, and applying the adaptive gating signal to the data strobe signal to generate a gated strobe signal having at least one of the sequence of data-timing pulses or the sequence of the parity-timing pulses gated out from the data strobe signal.

In one embodiment, the bypass circuit comprises a series of flip-flop elements configured as a clock divider to divide the data strobe signal received as an input down to the bypass signal provided as an output. In one embodiment, the strobe gating circuit comprises a gate synthesizer circuit to generate the adaptive gating signal, the gate synthesizer circuit comprising a latch element and a flip-flop element, wherein the latch element and the flip-flop element each receive the internal gating signal as an input. In one embodiment, an output of the latch element is provided to a set input of the flip-flop element, and wherein an output of the flip-flop element comprises the adaptive gating signal. In one embodiment, the latch element is clocked by a latch clock signal, the latch clock signal comprising a logical OR combination of the data strobe signal and the bypass signal. In one embodiment, the flip-flop element is clocked by a flop clock signal, the flop clock signal comprising a logical AND combination of the gated strobe signal and an inverse of the bypass signal. In one embodiment, the strobe gating circuit comprises a logic AND gate to logically combine the data strobe signal and the adaptive gating signal to generate the gated strobe signal, wherein adaptive gating signal is to account for drift in the data strobe signal relative to an internal timing domain of the integrated circuit component.

Embodiments of the present disclosure include an integrated circuit component comprising a data input to receive a data signal, a clock input to receive a clock signal having a first frequency, a clock divider circuit to divide the clock signal into a divided clock signal having a second frequency that is less than the first frequency, a deserializer circuit configured to deserialize the data signal into a parallel data stream, and a data buffer circuit configured to receive the parallel data stream via a write operation and output the parallel data stream via a read operation, wherein the deserializer circuit and the data buffer circuit operate in a divided clock cycle domain associated with the divided clock signal. In one embodiment, the data signal comprises double data rate (DDR) data, and wherein the integrated circuit component further comprises a slicer circuit to sample the DDR data using the clock signal having the first frequency to convert the DDR data to single data rate (SDR) data, wherein the slicer circuit operates in a fast clock cycle domain associated with the clock signal. In one embodiment, the clock signal having the first frequency comprises a gated strobe signal having at least one of a sequence of data-timing pulses or a sequence of parity-timing pulses gated out from a received data strobe signal. In one embodiment, the second frequency of the divided clock signal is one quarter of the first frequency of the clock signal. In one embodiment, the data buffer circuit comprises a first-in-first-out (FIFO) circuit. In one embodiment, the write operation for the data buffer circuit uses a write pointer generated based on the divided clock signal, and wherein the read operation for the data buffer circuit uses a read pointer generated based on an internal clock signal.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

What is claimed is:
1. An integrated circuit component comprising:
 a signal input to receive, via an external signal link, a data strobe signal comprising (i) a sequence of data-timing pulses preceded by a data preamble interval and succeeded by a data postamble interval, and (ii) a sequence of parity-timing pulses preceded by a parity preamble interval and succeeded by a parity postamble interval;
a bypass circuit to generate a bypass signal from the data strobe signal; and
a strobe gating circuit coupled to the signal input and to the bypass circuit and configured to:
generate an adaptive gating signal based on (i) an internal gating signal, and (ii) the bypass signal; and
apply the adaptive gating signal to the data strobe signal to generate a gated strobe signal having at least one of the sequence of data-timing pulses or the sequence of the parity-timing pulses gated out from the data strobe signal.

2. The integrated circuit component of claim 1, wherein the bypass circuit comprises a series of flip-flop elements configured as a clock divider to divide the data strobe signal received as an input down to the bypass signal provided as an output.

3. The integrated circuit component of claim 1, wherein the strobe gating circuit comprises a gate synthesizer circuit to generate the adaptive gating signal, the gate synthesizer circuit comprising a latch element and a flip-flop element, wherein the latch element and the flip-flop element each receive the internal gating signal as an input.

4. The integrated circuit component of claim 3, wherein an output of the latch element is provided to a set input of the flip-flop element, and wherein an output of the flip-flop element comprises the adaptive gating signal.

5. The integrated circuit component of claim 3, wherein the latch element is clocked by a latch clock signal, the latch clock signal comprising a logical OR combination of the data strobe signal and the bypass signal.

6. The integrated circuit component of claim 3, wherein the flip-flop element is clocked by a flop clock signal, the flop clock signal comprising a logical AND combination of the gated strobe signal and an inverse of the bypass signal.

7. The integrated circuit component of claim 1, wherein the strobe gating circuit comprises a logic AND gate to logically combine the data strobe signal and the adaptive gating signal to generate the gated strobe signal, wherein the adaptive gating signal is to account for drift in the data strobe signal relative to an internal timing domain of the integrated circuit component.

8. A method of operations of an integrated circuit component, the method comprising:
receiving, via an external signal link, a data strobe signal comprising (i) a sequence of data-timing pulses preceded by a data preamble interval and succeeded by a data postamble interval, and (ii) a sequence of parity-timing pulses preceded by a parity preamble interval and succeeded by a parity postamble interval;
generating, by a bypass circuit, a bypass signal from the data strobe signal;
generating, by a strobe gating circuit, an adaptive gating signal based on (i) an internal gating signal, and (ii) the bypass signal; and
applying the adaptive gating signal to the data strobe signal to generate a gated strobe signal having at least one of the sequence of data-timing pulses or the sequence of the parity-timing pulses gated out from the data strobe signal.

9. The method of claim 8, wherein the bypass circuit comprises a series of flip-flop elements configured as a clock divider to divide the data strobe signal received as an input down to the bypass signal provided as an output.

10. The method of claim 8, wherein the strobe gating circuit comprises a gate synthesizer circuit to generate the adaptive gating signal, the gate synthesizer circuit comprising a latch element and a flip-flop element, wherein the latch element and the flip-flop element each receive the internal gating signal as an input.

11. The method of claim 10, wherein an output of the latch element is provided to a set input of the flip-flop element, and wherein an output of the flip-flop element comprises the adaptive gating signal.

12. The method of claim 10, wherein the latch element is clocked by a latch clock signal, the latch clock signal comprising a logical OR combination of the data strobe signal and the bypass signal.

13. The method of claim 10, wherein the flip-flop element is clocked by a flop clock signal, the flop clock signal comprising a logical AND combination of the gated strobe signal and an inverse of the bypass signal.

14. The method of claim 8, wherein the strobe gating circuit comprises a logic AND gate to logically combine the data strobe signal and the adaptive gating signal to generate the gated strobe signal, wherein the adaptive gating signal is to account for drift in the data strobe signal relative to an internal timing domain of the integrated circuit component.

15. An integrated circuit component comprising:
a data input to receive a data signal;
a clock input to receive a clock signal having a first frequency, wherein the clock signal having the first frequency comprises a gated strobe signal having at least one of a sequence of data-timing pulses or a sequence of parity-timing pulses gated out from a received data strobe signal;
a clock divider circuit to divide the clock signal into a divided clock signal having a second frequency that is less than the first frequency;
a deserializer circuit configured to deserialize the data signal into a parallel data stream; and
a data buffer circuit configured to receive the parallel data stream via a write operation and output the parallel data stream via a read operation, wherein the deserializer circuit and the data buffer circuit operate in a divided clock cycle domain associated with the divided clock signal.

16. The integrated circuit component of claim 15, wherein the data signal comprises double data rate (DDR) data, and wherein the integrated circuit component further comprises:
a slicer circuit to sample the DDR data using the clock signal having the first frequency to convert the DDR data to single data rate (SDR) data, wherein the slicer circuit operates in a fast clock cycle domain associated with the clock signal.

17. The integrated circuit component of claim 15, wherein the second frequency of the divided clock signal is one quarter of the first frequency of the clock signal.

18. The integrated circuit component of claim 15, wherein the data buffer circuit comprises a first-in-first-out (FIFO) circuit.

19. The integrated circuit component of claim 15, wherein the write operation for the data buffer circuit uses a write pointer generated based on the divided clock signal, and wherein the read operation for the data buffer circuit uses a read pointer generated based on an internal clock signal.

* * * * *